Feb. 25, 1969    F. L. HILL ET AL    3,429,440
CONVEYOR TRANSFER DEVICE
Original Filed May 13, 1963
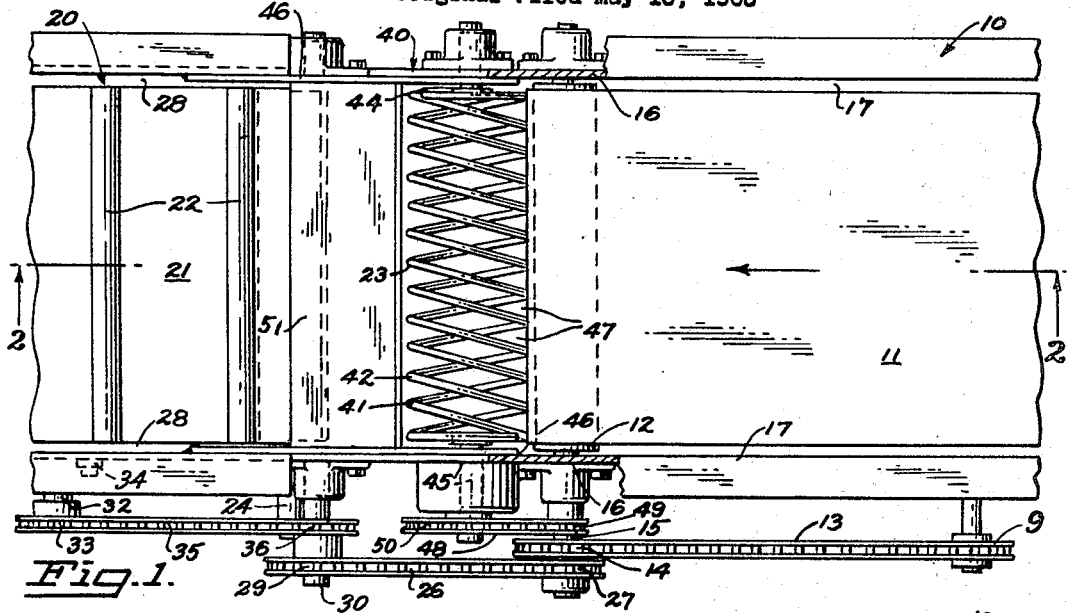
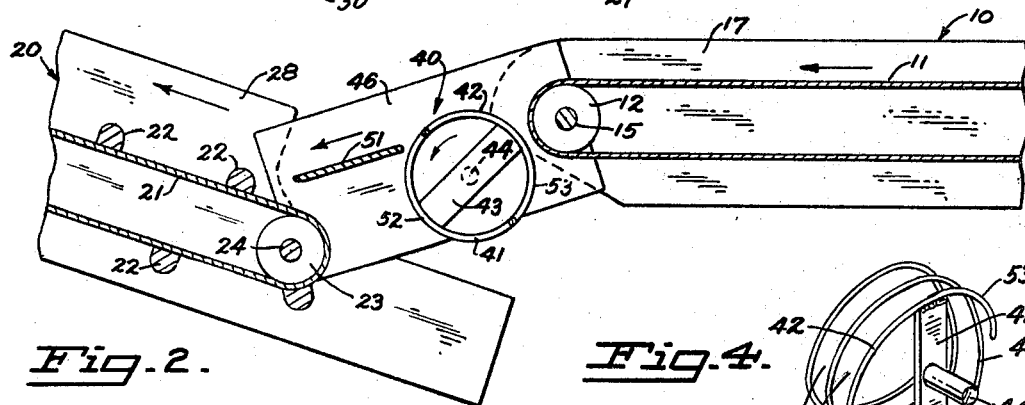
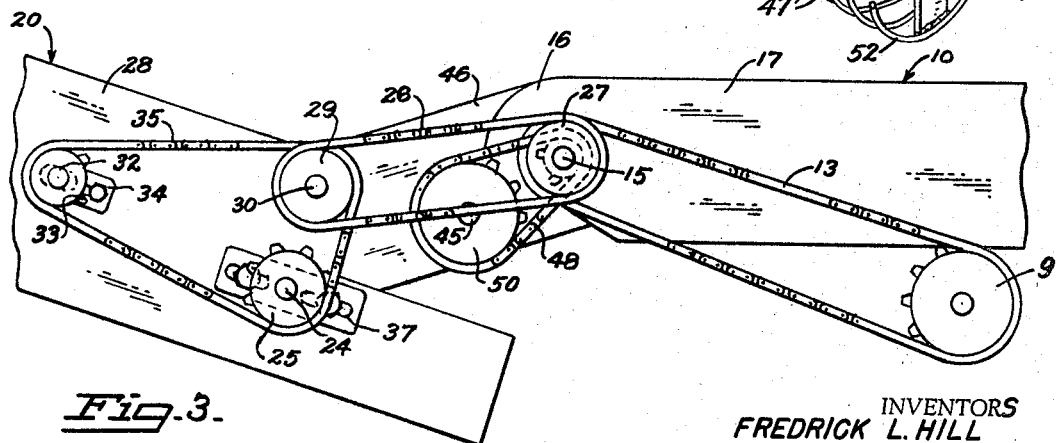
INVENTORS
FREDRICK L. HILL
LAUREN W. GATES
BY WILLIAM C. FRIEDEL, JR.
Owen, Wickersham & Erickson
ATTORNEYS

United States Patent Office 3,429,440
Patented Feb. 25, 1969

3,429,440
CONVEYOR TRANSFER DEVICE
Fredrick L. Hill, Lauren W. Gates, and William C. Friedel, Jr., Rio Vista, Calif., assignors to The Regents of the University of California, Berkeley, Calif.
Continuation of application Ser. No. 492,978, Sept. 17, 1965, which is a continuation of application Ser. No. 279,927, May 13, 1963. This application July 27, 1966, Ser. No. 568,347
U.S. Cl. 209—241                 9 Claims
Int. Cl. B07b 1/28

ABSTRACT OF THE DISCLOSURE

A tomato cleaner for separating the earth from tomatoes during the harvesting of the crop. The tomatoes are rolled by a sudden lateral movement over a helicoid which operates as a sifter.

---

This application is a continuation of application Ser. No. 492,978, now abandoned, filed on Sept. 17, 1965, which in turn is a continuation of application Ser. No. 279,927, now abandoned, filed on May 13, 1963.

This invention relates to a conveyor transfer device.

The device has many uses, but it is especially useful in devices for mechanically harvesting crops. For example, in certain tomato harvesters the tomato plants are severed from the roots, lifted, and shaken to remove the tomatoes; the tomatoes are carried on a conveyor system past an inspection and culling station and then are transferred from that conveyor system to a boom type of conveyor which carries them to a receiving truck which is being driven parallel to the harvester. The present invention is used at the point of transfer between conveyors.

Since the tomato plants are cut off from the roots at a point lying below ground and since the plants are lifted up from soil level, quite a few clods of dirt are carried along with the plants, and many of them remain with the tomatoes in spite of precautions taken at various stages to provide openings through which the dirt can fall. Such dirt does no particular harm so long as it is not loaded with the tomatoes into the bins which are transported by the receiving truck. At that point, however, the tomatoes should be as clean as possible so that the tomatoes can be packed very cleanly. Clean packing there saves money by eliminating later repacking elsewhere, but if the dirt is not removed before the tomatoes are packed into the bins, a repacking operation is required. Furthermore, dirt tends to puncture the tomatoes when the dirt is packed with them into bins and thereby leads to attack on the tomatoes by mold and bacteria. By packing the tomatoes free of dirt these problems are avoided, and the problem of dirt disposal and washing by the canner or other packer is minimized. Dirt removal is, of course, a problem with other crops, particularly those where some digging is involved in the harvesting operation and those where the crop is lifted directly from the soil.

The largest clods of dirt are removed or broken up early in the harvester, but many small clods and much fine dirt are conveyed past the inspection station, and one problem to which this invention is directed is the removal of these remaining pieces.

An important object of the present invention is to solve the problem of substantially eliminating dirt from the harvested crop. The object is achieved by providing a novel transfer device which can be installed at any transfer point from one conveyor to another moving in the same direction. Preferably it is installed at the transfer point between a permanently mounted conveyor on the harvester and a boom conveyor which goes out to one side of the harvester. Our new transfer device moves the food article being harvested from one conveyor to the other, while separating out and disposing of the accompanying dirt.

Other objects and advantages of the invention will appear from the following description of a preferred form of the invention.

In the drawings:

FIG. 1 is a fragmentary top plan view of a portion of two belt type conveyors which are moving in the same direction and are joined by a transfer mechanism embodying the principles of the invention.

FIG. 2 is a view in side elevation and in section taken along the line 2—2 in FIG. 1.

FIG. 3 is a view in side elevation of the device of FIG. 1.

FIG. 4 is a fragmentary view in perspective of one end of the transfer drum.

The drawings show one end of a front cross conveyor 10 of the type used in some tomato harvesters; its belt 11 is driven by a roller 12 which, in turn, is driven through a chain 13 from a sprocket wheel 9 that is itself driven by any suitable driving mechanism (not shown). The chain 13 engages a sprocket wheel 14 on the shaft 15 of the roller 12, the shaft 15 being supported by a suitable frame 16 having side walls 17 extending above the belt 11.

The drawings also show the lower end of a boom conveyor 20 having a flighted belt 21 with flight blocks 22, driven by a roller 23 at that lower end. The roller 23 has a shaft 24 to which is secured a sprocket wheel 25. A chain 26 connects a sprocket wheel 27 on the shaft 15 to a sprocket wheel 29 on a short shaft 30, which, like the shaft 24, is supported by the frame 28 of the boom conveyor 20. The frame 28 also rotatably supports a movable idler stub shaft 32 with a sprocket wheel 33 and mounted on a slotted bracket 34; a chain 35 engages the sprocket wheels 25 and 33 and also engages a sprocket wheel 36 on the shaft 30. The shaft 24 is mounted adjustably by means of slotted brackets 37, so that the front roller 23 can be moved fore and aft of the frame 28, thereby changing the position of the forward end of the belt 21. When this is done, the position of the sprocket wheel 25 is changed, but by moving the shaft 32, the sprocket wheel 33 is also moved, so that slack on the chain 35 may be taken up or the chain may be loosened. Thus the shaft 30 transfers the drive from the front conveyor 10 (at its roller shaft 15) to the boom conveyor 20 (at its roller shaft 24), and both the belts 11 and 21 are driven at the same speed.

The front cross conveyor 10 may have a flat conveyor belt 11 which runs along a flat path, and the fruit and whatever else is carried by the conveyor 10 fall off as the belt 11 passes around the roller 12. The boom conveyor 20, as said, preferably has a flight type of conveyor belt 21 having a series of cross bars or flights 22 by which tomatoes can be moved up at a relatively vertical inclination without rolling down. This conveyor 21 picks up the tomatoes at a point just above the drive roller 23.

The transfer device 40 of this invention comprises an open drum-like structure preferably made up of a pair of oppositely phased helical wire coils 41 and 42. The coils 41 and 42 may be secured at each end to a bar 43 which is rigidly secured to a stub shaft 44 or 45, and the stub shafts are rotatably supported by a frame 46 for the transfer device 40. If desired, a single coil may be used, but by using the two coils 41 and 42, the strength of the structure is increased and the function is improved by the fact that the helix angle is greater. The coils 41 and 42 are very open wound, so that there is considerable space 47 between successive turns even from one coil to the other. The spaces 47 are much larger than the wires; preferably the wires occupy only about one-fourth or one-fifth of the peripheral area. The two coils 41 and 42 run parallel to each other, 180° apart, and impart a helical type of rotation when the device 40 is turned. This helicoid device 40 is positively driven by a drive chain 48 that engages a sprocket wheel 49 on the front conveyor shaft 15 and a sprocket wheel 50 on the stud shaft 45. The diameter of the sprocket wheel 50 is so related to that of the sprocket wheel 49 that the linear speed of the belt 11 and the peripheral speed of the transfer device 40 are nearly, but not quite, the same. The slight speed differential disturbs or agitates the blanket of particles passing from the belt 11 to the belt 21, and this helps to improve the separation of the dirt and waste from the tomatoes. In addition, the helicoid means 40 moves the tomatoes laterally and rolls them laterally of the conveyor belt 11 and produces a tumbling motion to further increase the agitation and promote dirt separation.

Thus, as the tomatoes fall off the end of the belt 11, they are carired along by the coil transfer device 40 on a short arcuate and slightly helical path from the front conveyor belt 11 to a solid apron 51 on the opposite side of the transfer device 40 from the belt 11. The tomatoes then roll down by gravity over the apron 51 onto the flight belt 21 of the boom conveyor 20. However, dirt particles which have accompanied the tomatoes along the belt 11 fall through the spaces 47 between the coils 41 and 42, being smaller than the distance between successive turns, and fall down to the ground, for the space below the drum 40 is open. As an example, one such device 40 has a coil portion approximately 15" long, with each of two coils 41 and 42 of ¼" wire making approximately six turns in that distance, leaving about an inch between successive wires. Dirt particles larger than one inch in diameter have already been removed before they reach this point. Thus, the remaining dirt drops out through the transfer device 40 while the tomatoes or other fruit or food product being harvested is carried across the device 40 and goes up the flight conveyor 20.

In making the device, it is preferable that the two coils 41 and 42 each terminate in an arcuate portion 52, 53 at their outer ends beyond and coplanar with the mounting bar 43. Thus, each coil 41, 42 approaches the bar 43 at its helical angle of pitch and at the bar 43 is bent to be in the plane of the bar 43 from then on. The cross bar 43 is welded to the two coils 41 and 42, and the arcuate portions 52, 53 extend about 90° beyond the bar 43, in order that there not be either a greatly enlarged space at each end (as there would be if there were no arcuate portion beyond the bar 43) or a narrow constriction where things could catch (as there would be if the coils 52, 53 extended 180° to the other ends of the bar 43).

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:
1. A device for ridding objects of foreign matter, comprising two successive collinear conveyors moving in the same direction, a hollow helicoid drum mounted between the succeeding ends of said conveyors with its axis transverse to the axis of said conveyors for transferring said objects from one said conveyor to the other, said helicoid having shaft means only at its ends and helix turns that diverge only slightly from the direction in which said conveyors move, so that said objects are only slightly diverted from their path, with openings between adjacent turns of the helix large enough so that the foreign matter drops through but smaller than the objects to be transferred, means for rotating said helicoid, and an apron between said drum and one of said conveyors.

2. A device for ridding objects of foreign matter, comprising two successive collinear conveyors moving in the same direction, a hollow helicoid drum mounted between the succeeding ends of said conveyors with its axis transverse to the axis of said conveyors for transferring said objects from one said conveyor to the other, said helicoid having shaft means only at its ends and helix turns that diverge only slightly from the direction in which said conveyors move, so that said objects are only slightly diverted from their path, with openings between adjacent turns of the helix large enough so that the foreign matter drops through but smaller than the objects to be transferred, and means for rotating the helicoid to impart a peripheral speed thereto which is different from the linear speed of the conveyors.

3. A device for conveying and ridding tomatoes of foreign matter comprising at least two successive collinear conveyors moving in the same direction and at an angle to each other, a helicoid drum mounted between the succeeding ends of said conveyors, means for receiving and guiding the tomatoes from a point closely adjacent the helicoid to a point closely adjacent the second conveyor, said helicoid having openings between adjacent turns of the helix large enough so that the foreign matter drops through but small enough to prevent the tomatoes from dropping through, and means for rotating the helicoid.

4. A transfer device for separating objects being conveyed into two different size groups, comprising a first conveyor, a second conveyor moving in the same direction, a hollow helicoid mounted transversely between said conveyors over which said objects pass and having adjacent turns of narrow width spaced apart and diverging only slightly from the direction in which the conveyors move, means for rotating said helicoid, whereby objects smaller than the spaces between the adjacent turns fall through the member while objects larger than those spaces are carried to said second conveyor, and an apron between said helicoid and the second conveyor.

5. A transfer device for transferring food products, comprising a first generally horizontal conveyor having a side frame and a terminal end, a second conveyor moving in the same direction as said first conveyor and having a side frame and an initial end lower than the terminal end of said first conveyor and spaced away therefrom, an open-wound helicoid drum having uniformly sized openings between adjacent turns of the helix, means supporting said drum transverse to said conveyors, the turns of its helix extending generally in the same direction as said conveyors, with the drum slightly below and closely adjacent said terminal end and higher than said initial end of said second conveyor, means for rotating said helicoid so that the upper arc moves in the same direction as said conveyors, and a downwardly inclined apron between said helicoid and said second conveyor.

6. A conveyor transfer and separation device comprising a first generally horizontal conveyor device having a first frame with upwardly extending side walls, a first shaft at a terminal end, and a first moving conveyor in driving relation with said shaft; a second conveyor device having a second frame with upwardly extending side walls, a second shaft at an initial end, and a second moving conveyor in driving relation with said second shaft and moving in the same direction as said first conveyor and in line therewith, said initial end of said second conveyor device being lower than the terminal end of said first conveyor and spaced away therefrom, a transfer frame having upwardly extending side walls and open in between them, said transfer frame side walls being pivotally mounted about both said shafts, a helicoid wire member having two open-wound helical members 180° out of phase supported by said transfer frame slightly below and closely adjacent said terminal end and higher than said initial end of said second conveyor and with their wires diverging only slightly from the direction in which said conveyors move and having openings provided by a substantially constant spacing between said wires much greater than the diameter of the wire from which the helix is made, diametral cross bars at each end of said helicoid joined to both said wires and joined only by said wires and closely adjacent the side walls of said transfer frame, a stub shaft connected to each cross bar and extending only outwardly and mounted in said transfer frame, means for driving said helicoid through one said stub shaft from one of said conveyors to rotate the helicoid so that its upper arc moves in the same direction as said conveyors, and a downwardly inclined apron between said helicoid and said second conveyor.

7. The device of claim 6 wherein at each end each said wire extends about 90° beyond said cross bar in the plane of said cross bar to control the size of the openings at each end.

8. A device for conveying and ridding tomatoes of foreign matter comprising at least two successive collinear planar conveyors, and means for rolling the tomatoes in the direction of movement of the conveyors from one conveyor to the other and for rolling the tomatoes laterally of said direction to thereby give a tumbling motion to the tomatoes, the means for rolling the tomatoes laterally of the direction of movement of the conveyors being a hollow open-wound helicoid located between said conveyors, through which helicoid the foreign matter can fall while the tomatoes are directly supported by said helicoid and means for rotating said helicoid.

9. A device for conveying and ridding tomatoes of foreign matter comprising at least two successive endless collinear conveyors, means for moving said conveyors in the same direction, and means for agitating and transferring the tomatoes from one conveyor to the next, said means for agitating and transferring comprising a hollow open-wound helicoid enabling passage of foreign matter therethrough between adjacent ends of said conveyors, and means for rotating said helicoid about its axis at a surface speed different from said conveyors, whereby foreign matter is shaken from the tomatoes and falls through the open-wound helicoid.

References Cited

UNITED STATES PATENTS

| 339,972 | 3/1886 | Crane | 209—241 |
| 427,660 | 5/1890 | Beach | 209—308 X |
| 1,491,211 | 3/1924 | Taylor | 209—12 X |
| 1,895,268 | 1/1933 | Silver | 209—307 X |
| 1,975,687 | 10/1934 | Grabill | 15—3.17 |
| 2,287,447 | 6/1942 | Peeples | 15—3.17 X |
| 2,707,554 | 5/1955 | Dempsey | 209—12 |
| 2,924,838 | 2/1960 | Jones | 15—3.17 X |

FOREIGN PATENTS

| 580,175 | 8/1924 | France. |
| 1,056,648 | 10/1953 | France. |
| 64,997 | 10/1892 | Germany. |
| 560,867 | 3/1944 | Great Britain. |
| 688,441 | 3/1953 | Great Britain. |

HARRY B. THORNTON, *Primary Examiner.*

R. HALPER, *Assistant Examiner.*

U.S. Cl. X.R.

209—362; 198—103; 171—131